GROUT & LAWTON.
Grain-Drill.
No. { 1,472, 32,476. }
Patented June 4, 1861
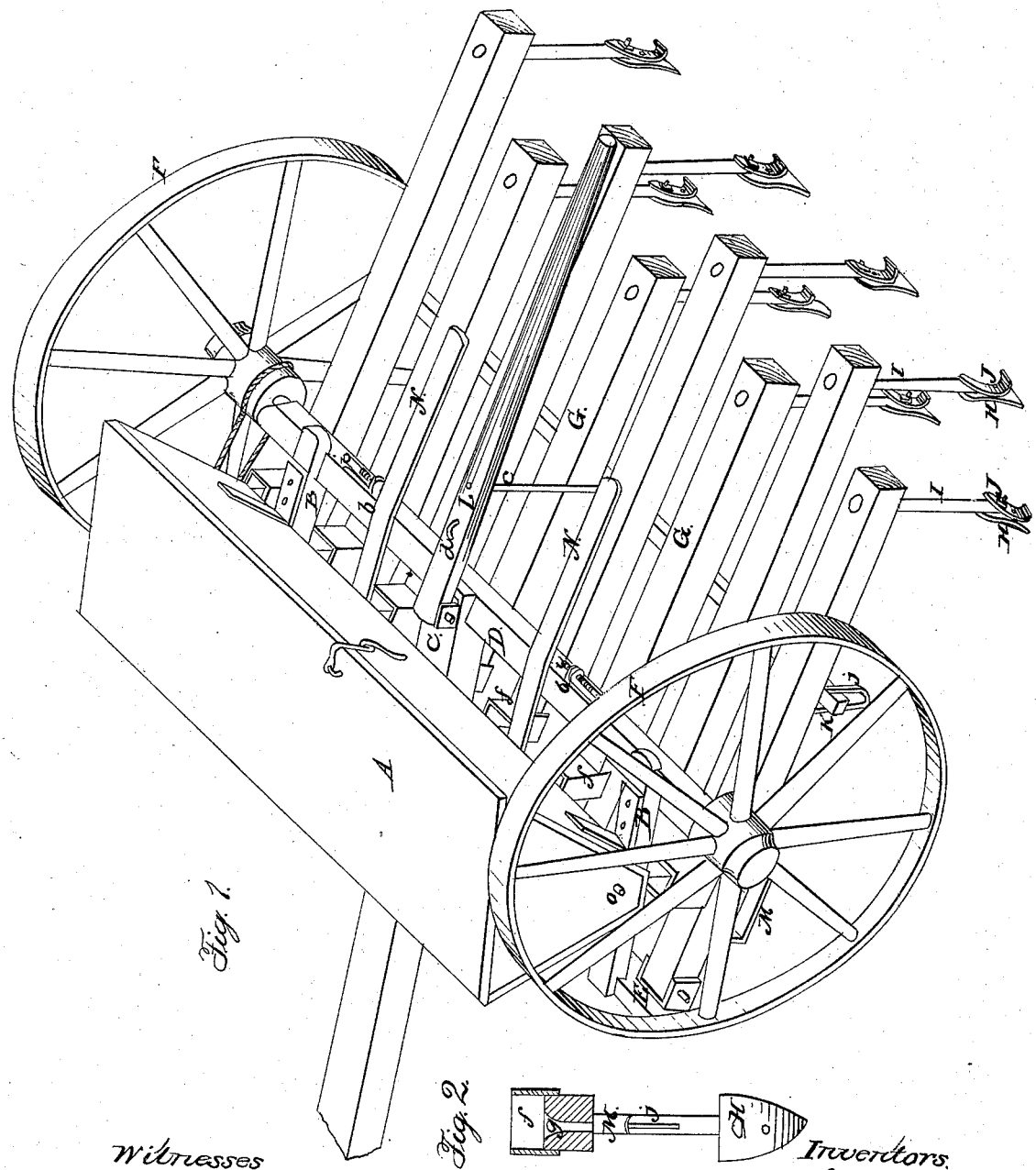

UNITED STATES PATENT OFFICE.

M. GROUT AND C. LAWTON, OF OAK GROVE, WISCONSIN.

IMPROVEMENT IN SEEDING-MACHINES.

Specification forming part of Letters Patent No. 32,476, dated June 4, 1861.

*To all whom it may concern:*

Be it known that we, MORRIS GROUT and CLARK LAWTON, of Oak Grove, in the county of Dodge and State of Wisconsin, have invented a new and Improved Seeding-Machine; and we do hereby declare that the following is a full, clear, and exact description of the same, reference being had to the accompanying drawings, making part of this specification, in which—

Figure 1 is a perspective view of my machine. Fig. 2 is a vertical transverse section of one of the hinged bars, taken through the seed-cup and stirrup, looking from the front.

Similar letters of reference indicate corresponding parts in both figures.

A represents a seed box or hopper, converging from top to bottom, and supported at each end and in the center upon bars B B and tongue C, which are attached at their ends, respectively, to axle D and cross-piece E.

The machine is mounted upon wheels F F, which are fitted upon gudgeons formed upon the ends of the axle.

G G represent a series of bars or stocks projecting backward and hinged to the cross-piece E, so as to have independent movement.

H H represent cultivator-teeth rigidly attached to the standards I I, secured in the bars or stocks alternately in two lines, forming a zigzag course.

J J are adjustable gages attached to the rear side of the standards I I by means of a screw-bolt and nut for the purpose of regulating the depth of the furrow.

K is a bar extending transversely of the machine underneath the stocks, and suspended midway of its length by means of a rod, c, from the lever L, falcrumed in the end of the tongue. The transverse bar K is confined to the stocks by means of staples j j.

When it is desired to use the seeding apparatus independently of the cultivators, or to transport the machine, the cultivators can be elevated by means of the lever L and retained in an elevated position by means of a hook, d, on the lever L. Catching into a staple, e, on the hopper f f are cups fastened on the upper side of the hinged bars, immediately over apertures g, (seen in Fig. 2,) and immediately under the apertures in the bottom of the seed-hopper.

M M are stirrups attached to the under side of the hinged bars, under the seed-aperture therein. The bottoms of the said stirrups are of convex form on their upper surfaces, for the purpose of better scattering the seed dropping thereon from the hopper.

Fitted on the bottom of the inside of the hopper are two slides, which are connected respectively to pivoted levers N N', by which means either one or both slides can be moved independently. The said slides are provided with a series of apertures corresponding with those in the bottom of the hopper, so that by moving either one of the levers in one direction the apertures in that side of the hopper will be opened and allow the seed to issue into the cups beneath, and by moving it in the other direction they will be closed, and the communication with the cups cut off.

h h are ears attached to the rear side of the axle, and provided with screws i i, by adjusting which the levers are caused to open or close the apertures in the hopper to a greater or less degree, and the quantity of seed dropping thereby regulated as desired.

O is an armed shaft or stirrer extending longitudinally of the seed-hopper, and journaled in the ends of the same. A revolving motion is imparted to the said stirrer by means of a band or belt passing around the inner side of the hub of one wheel and a score-pulley on one end of the stirrer.

The advantage of having a divided slide, or two instead of one, is that in sowing around stumps, trees, and other obstacles either half of the seeding-machine may be used at pleasure instead of the whole. The hinged arms having independent movement, the teeth adapt themselves to the inequalities of the ground, thus cultivating even or uneven ground equally well.

A machine constructed as described, drawn by a pair of horses, will sow and cultivate with ease ten acres per day.

What we claim as new, and of our invention herein, and desire to secure by Letters Patent, is—

The combination of the hopper A, stocks G, teeth H I J, bar K, rod c, lever L, independent seed-slides N N', gage-arms i, and stirrups M, constructed, arranged, and operating substantially as and for the purposes set forth.

MORRIS GROUT.
CLARK LAWTON.

In presence of—
C. BILLINGHURTH,
ELBERT B. PARMELEE.